(12) United States Patent
Marino et al.

(10) Patent No.: US 9,839,290 B2
(45) Date of Patent: Dec. 12, 2017

(54) ANTI-SEISMIC ISOLATOR

(71) Applicant: B2B S.r.l., Alba (IT)

(72) Inventors: Ferruccio Marino, Alba (IT); Alessio Toneguzzo, Turin (IT)

(73) Assignee: B2B S.R.L., Alba (IT)

( * ) Notice: Subject to any disclaimer, the term of this patent is extended or adjusted under 35 U.S.C. 154(b) by 0 days.

(21) Appl. No.: 14/766,973

(22) PCT Filed: Feb. 11, 2014

(86) PCT No.: PCT/IB2014/058922
§ 371 (c)(1),
(2) Date: Aug. 10, 2015

(87) PCT Pub. No.: WO2014/122635
PCT Pub. Date: Aug. 14, 2014

(65) Prior Publication Data
US 2015/0374127 A1 Dec. 31, 2015

(30) Foreign Application Priority Data
Feb. 11, 2013 (IT) .............................. TO2013A0111

(51) Int. Cl.
*A47B 91/00* (2006.01)
*F16F 15/02* (2006.01)
(Continued)

(52) U.S. Cl.
CPC .............. *A47B 91/00* (2013.01); *A47B 91/08* (2013.01); *A47B 91/16* (2013.01); *B65G 1/02* (2013.01);
(Continued)

(58) Field of Classification Search
CPC .......... F16F 15/02; E04H 9/023; A47B 91/00; A47B 91/16; A47B 91/08; B65G 1/02; B65G 2207/20
See application file for complete search history.

(56) References Cited

U.S. PATENT DOCUMENTS 3,146,979 A    7/1961  Keetch
3,115,326 A *  12/1963 Barringer ................ F16F 15/02
                                                          248/583

(Continued)

FOREIGN PATENT DOCUMENTS

EP    0 143 052 A2   5/1985
IT    1327395        2/2001

(Continued)

*Primary Examiner* — Phi A
*Assistant Examiner* — Omar Hijaz
(74) *Attorney, Agent, or Firm* — Seed Intellectual Property Law Group LLP

(57) ABSTRACT

Anti-seismic isolator for isolating of a structure provided with support feet with respect to a ground subject to vibrations induced for example by an earthquake, said isolator comprising an oscillating element that can be associated with at least one of the supporting feet of said structure and a supporting framework provided with a supporting base adapted to support the isolator with respect to the ground, in which said oscillating element and said supporting framework are associated with each other by means of connecting elements sliding in pairs of substantially parallel arched guides, arranged in at least one out of said oscillating element and said supporting framework, whereby said oscillating element and said supporting framework are mutually oscillating and the mutual oscillation of the oscillating element and of the supporting framework causes the simultaneous mutual sliding thereof along two directions perpendicular to each other.

14 Claims, 13 Drawing Sheets

(51) Int. Cl.
  *B65G 1/02* (2006.01)
  *E04H 9/02* (2006.01)
  *A47B 91/08* (2006.01)
  *A47B 91/16* (2006.01)

(52) U.S. Cl.
  CPC ............ *E04H 9/023* (2013.01); *F16F 15/02* (2013.01); *B65G 2207/20* (2013.01)

(56) References Cited

U.S. PATENT DOCUMENTS

| | | | |
|---|---|---|---|
| 3,638,377 A | | 2/1972 | Caspe |
| 4,330,103 A | | 5/1982 | Thuries et al. |
| 4,687,174 A | * | 8/1987 | Helary .................... E04H 9/023 248/638 |
| 5,382,008 A | * | 1/1995 | Tyutinman .............. E04H 9/021 248/584 |
| 6,419,203 B1 | * | 7/2002 | Dang ...................... F16F 15/02 248/585 |
| 2004/0262487 A1 | | 12/2004 | Kawashima et al. |
| 2007/0125930 A1 | * | 6/2007 | Tsai ........................ E04H 9/023 248/580 |
| 2007/0130848 A1 | | 6/2007 | Tsai |
| 2007/0158133 A1 | * | 7/2007 | Gebelin ................. E04H 9/023 181/0.5 |
| 2013/0243526 A1 | * | 9/2013 | Williamson ............ F16F 15/02 404/133.1 |

FOREIGN PATENT DOCUMENTS

| WO | 00/37823 A1 | 6/2000 |
|---|---|---|
| WO | 2005/049942 A1 | 6/2005 |
| WO | 2008015717 A1 | 2/2008 |
| WO | 2009/034585 A1 | 3/2009 |

* cited by examiner

ANTI-SEISMIC ISOLATOR

BACKGROUND

Technical Field

The present invention relates to an anti-seismic isolator. The invention relates in particular, but not exclusively, to a seismic isolator adapted to be used to isolate storage load-bearing structures, industrial shelving units, scaffoldings and the like, with respect to the bearing pavement. The invention can also be applied in all those cases in which it is necessary to protect these structures and their contents, if any, from the consequences deriving from unwanted movements consequent for example to accidental shocks due to the loading and unloading of goods with lifting and transport means.

Description of the Related Art

Nowadays many jurisdictions have adopted regulations requiring the adoption of measures aimed at reducing damage to property and persons, resulting from a seismic event.

In the case of a shelving unit, the effect of an earthquake may not only cause the failure of the load-bearing structure, but more frequently it can affect its stability, with the consequent risk of tipping or falling objects.

This phenomenon can be particularly detrimental in the case of industrial shelving units placed, for example, in crowded sale premises, such as those in a department store.

Anti-seismic isolators are devices developed to protect structures of various types, from the effects of an earthquake.

Single or double pendulum anti-seismic isolators are known, which are generally used for large structures, such as bridges or buildings. These are anti-seismic devices which generally comprise a hemispherical structure, slidable on a sliding surface on which sliding materials are arranged, which cause the viscous damping of the vibrations.

WO2009034585 (A1) discloses an example of a pendulum anti-seismic isolator, provided with elements sliding perpendicularly with respect to other.

U.S. Pat. No. 3,146,979 discloses an anti-seismic isolator comprising a pair of parallel circular plates arranged horizontally, between which a plurality of spheres is provided. The lower plate is arranged against the ground and the upper plate serves as a support for the structure to be protected. The spheres between the plates are housed in a circular channel, the section of which is larger than the diameter of the spheres. The device allows a mutual movement between the plates when they are stressed by cross vibrations or shocks. In such conditions, the shape of the channel in which the spheres are housed causes the upward displacement of the upper plate and thus most of the horizontal component of the energy is converted into a vertical component.

WO-A-00/37823 discloses an isolating apparatus against the vibrations induced by an earthquake and comprises a pair of plates interconnected by a sliding element arranged at the center and associated with each other at the periphery by means of elastic connecting arms. The central sliding element allows mutual horizontal displacement of the plates, while the elastic arms determine the return of the plates in the initial position.

U.S. Pat. No. 3,638,377 describes an earthquake-resistant warehouse structure for the storage of material, wherein the support feet of the structure are designed so as to allow a relative displacement between the structure and the pavement.

Another example of an anti-seismic protection device is described in U.S. Pat. No. 4,330,103. Also this method provides for plates sliding horizontally relative to each other equipped with elastic elements and friction material to dampen oscillations.

An improved anti-vibration isolator is described in JP-A-4 330 103. This device is provided with a pair of horizontal parallel plates, between which sliding elements are arranged that are associated with elastic elements, which tend to bring the plates back to the starting position.

WO 2005/049942 describes an interface isolator/dissipator for interfacing between the ground and supporting structures comprising a supporting base attachable to the ground, which supports a contact base that can be associated, by way of kinematic connecting means, with a lower portion of at least one supporting upright of a supporting structure; between the contact base and the supporting base there are interposed interface means that are adapted to allow the contact base to move with respect to the supporting base at least along two directions parallel to the ground. The isolator/dissipator is also provided with return means, operating between the supporting base and the contact base, adapted to control the relative displacement between the supporting base and the contact base.

A device intended to reduce the intrinsic stiffness of a supporting structure, such as an industrial shelving unit or the like, is also described in IT-1 327 395. However, unlike the previous solution, this device does not allow the damping of vibrations along a multiplicity of directions.

The known solutions have a series of drawbacks, which can be summarized in the substantial inability in simultaneously fulfilling different needs, which are, however, crucial for the proper operation of the isolator in all conditions.

A first requirement stems from the need for the isolators to oscillate with their own frequency of oscillation, independent of the mass of the associated structure. This need is particularly evident in the case of shelving units that are subjected to loads that considerably vary over time.

Moreover, the isolator must be capable of withstanding vertical compression or traction loads directly on the isolating element.

BRIEF SUMMARY

One object of the invention is to provide an isolator, which does not have the drawbacks of the prior art and which can be used in a multiplicity of applications.

Another object of the invention is to provide a single or double pendulum isolator, adapted to operate with vertical actions of compression and traction, without varying its constitutive law in the two senses of the action, so as not to diverge from the mathematical calculation model, with respect to the operation in the shelving units subject to overturning.

A further object of the invention is to provide an isolator of the above-mentioned type, which can be used to isolate existing industrial shelving structures, without subjecting these to changes.

A still further object of the invention is to provide an isolator, which can be constructed by combining a reduced number of modular components and which thus can serve various conditions of use.

An even further object of the invention is to provide an isolator of the above-mentioned type, which is simple to construct and can thus be industrially produced on a large scale.

Advantageously, the isolator can be constructed in a single or double pendulum configuration.

The single pendulum configuration is advantageously simple and economical to produce, while the double pendulum configuration has a greater re-centering capability and smaller overall dimensions for the same stroke of the oscillating element.

Advantageously, both configurations are based on the same principle that provides for an oscillating element and a supporting framework associated with each other by means of connection elements slidable in pairs of substantially parallel arched guides arranged in at least one out of said oscillating element and said supporting framework, whereby said oscillating element and said supporting framework are mutually oscillating and the mutual oscillation of the oscillating element and of the supporting framework causes the simultaneous mutual sliding thereof along two directions perpendicular to each other.

It follows from this common principle also that the oscillating element does not move in a straight direction, but describes a circular arc, which is exactly the motion of a pendulum.

Advantageously, according to a preferred embodiment of the invention, the geometry of the motion of the pendulum is determined by the profile of the guides preferably defined by inserts which, depending on the application, may be manufactured with an arc or a specific curve according to the need of returning in the rest position.

Advantageously, the isolator is provided for isolating a structure equipped with supporting feet, uprights or the like, from a supporting ground or pavement subject to the vibrations induced by an earthquake or by shocks. Said structure may for example comprise an industrial shelving unit and the supporting ground can be defined for example by the pavement of a room used for storage or sale of the products housed in the structure.

The single or double pendulum isolator is particularly suitable to be used for shelving units or the like adapted to be loaded with masses that are different and may vary in operation, as the frequency of calculation depend only on the geometry arc and on friction.

Advantageously, since friction phenomena are preferably minimized, for the insertion of rolling elements in all the contact points of the pendulum isolator, the theoretical constitutive law of behavior of the isolator will result in the ideal constitutive law.

Further advantageously, the isolator is simple and economical to produce because, intervening only on some components, it can be transformed from double to single and vice versa depending on the operational needs.

The single operating direction of the isolator in its preferred embodiment is advantageous in particular when the isolator is used for shelving units. In fact, many structures are already naturally transversally isolated by their nature, having very high vibration periods, and therefore are not energized, in the event of earthquakes, by large accelerations along these directions. Moreover, many structures, such as shelving units, released from the ground, tend to be labile or to accentuate phenomena of elastic instability, in the cross directions that are not braced, and consequently it is advantageous to prevent the displacements along these directions only.

The invention allows to achieve an economic, modular solution that is non-invasive in terms of installation, and it is not subject to deterioration or maintenance over time.

The use of a double pendulum solution with respect to the single pendulum solution makes it possible to obtain characteristic isolation frequencies with very small radii, therefore the return action to the rest position is very accentuated.

Advantageously, according to this double pendulum configuration, shelving units do not risk to be misaligned during the operations of pallet storage by any impacts of forklift trucks.

The connecting pins can be in a position raised from the floor, avoiding problems related to deposit of material that prevents the free oscillation with respect to the guides. Therefore, it prevents the need of frequently inspecting the isolators and frequently cleaning the components, or assembling bellows or rubber bellows.

BRIEF DESCRIPTION OF THE SEVERAL VIEWS OF THE DRAWINGS

Some embodiments of the invention will be described by way of example and without limitation to the accompanying drawings in which.

DETAILED DESCRIPTION

In all the figures the same numerical references were used to indicate identical or functionally equivalent components.

Figure 1:
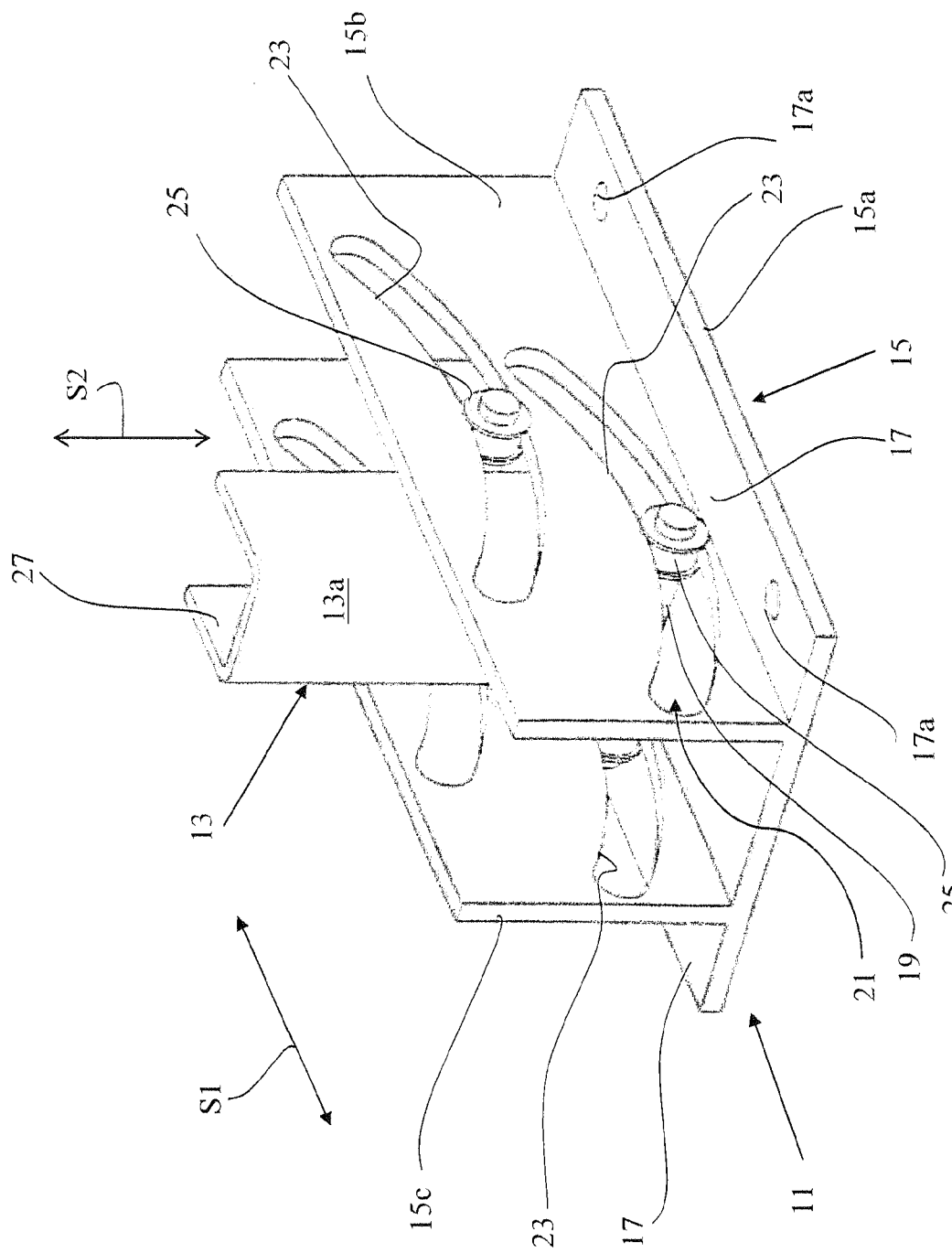
FIG. 1 is a perspective view of the isolator according to the invention in a single pendulum embodiment.

Referring to FIG. 1, there is shown a first embodiment of the isolator according to the invention, which has been generally indicated by reference 11.

According to this first embodiment of the invention, the isolator 11 comprises an oscillating element 13 associable to the base or to at least one of the supporting feet, or equivalent component, of a structure that must be isolated from the ground. The isolator 11 further includes a supporting framework 15, adapted to support the isolator 11 with respect to ground.

In a preferred embodiment of the invention, the framework 15 has a U-shaped cross section and includes a base plate 15a suitable to rest on the ground, such as a pavement, and pairs of side walls 15b, 15c parallel to each other and perpendicular to the corresponding base plate 15a. In operating conditions, the U-shaped framework 15 will have the concavity facing upwards as shown in FIG. 1, i.e., towards the structure to be isolated.

The framework 15 is preferably made of metal, for example steel or aluminum, and may be obtained for example by bending a metal sheet, or by welding separate elements, or by molding. However, it is possible to decide to obtain the framework 15 by molding plastics or composite materials.

The base plate 15a of the framework 15 may further comprise side projections 17, provided with holes 17a for the passage of fastening means, such as screws or bolts (not shown), which will allow to firmly anchor the framework 15 to the ground, such as a pavement.

Still in accordance with this first embodiment of the invention, the oscillating element 13 and the supporting framework 15 are associated with each other by means of connecting elements 19, which in the illustrated example are defined by corresponding cross pins.

The pins 19 have respective ends slidable relative to corresponding arched guides 21 which, in this embodiment of the invention, include corresponding arched slots 23, formed in the side walls 15b, 15c of the supporting framework 15. Said slots 23 may advantageously be made for example by means of the laser cutting technique.

Still in accordance with this first embodiment of the invention, the aforesaid ends of the pins 19 will be advantageously provided with idle bushings 25 interposed between the pins 19 and the surface of the slots 23. Said bushings 25 are advantageously adapted to rotate within the slots 23 with a certain backlash and, consequently, to prevent the pins 19 from sliding during the oscillation of the oscillating element 13 relative to the framework 15.

In a preferred embodiment of the invention, the oscillating element 13 comprises a seat 27 for receiving a foot, an upright, or a similar support portion of the structure, which must be supported by the isolator 11. In the illustrated example, the seat 27 is formed inside a box element 13a, which defines the oscillating element 13 and to which the connection pins 19 are fixed, for example by welding. Said pins 19 may alternatively rotate and pass through holes 13 provided in the oscillating element 13.

The concavity of the slots 23 is advantageously facing upwards, i.e., towards the structure associated with the oscillating element 13 of the isolator 11, so as to define a point of static equilibrium for the structure, placed substantially at the center of the slot 23.

In this embodiment of the invention, the connecting elements 19 will be two and the guides 21 or slots 23 will correspondingly be four 23, two of which on the wall 15b, and two on the wall 15c of the framework 15.

Advantageously, due to this configuration, the oscillating element 13 and the supporting framework 15 are mutually oscillating and the mutual oscillation of the oscillating element 13 and of the framework 15 causes the simultaneous mutual sliding thereof along two directions perpendicular to each other indicated with the arrows S1 and S2 in the figure.

With reference to FIGS. 2 to 6 an isolator is shown in a second embodiment of the invention, generally indicated by reference 111.

In accordance with this second embodiment of the invention, the isolator 111 provides an oscillating element 113 comprising an oscillating framework 129.

Figure 2A:
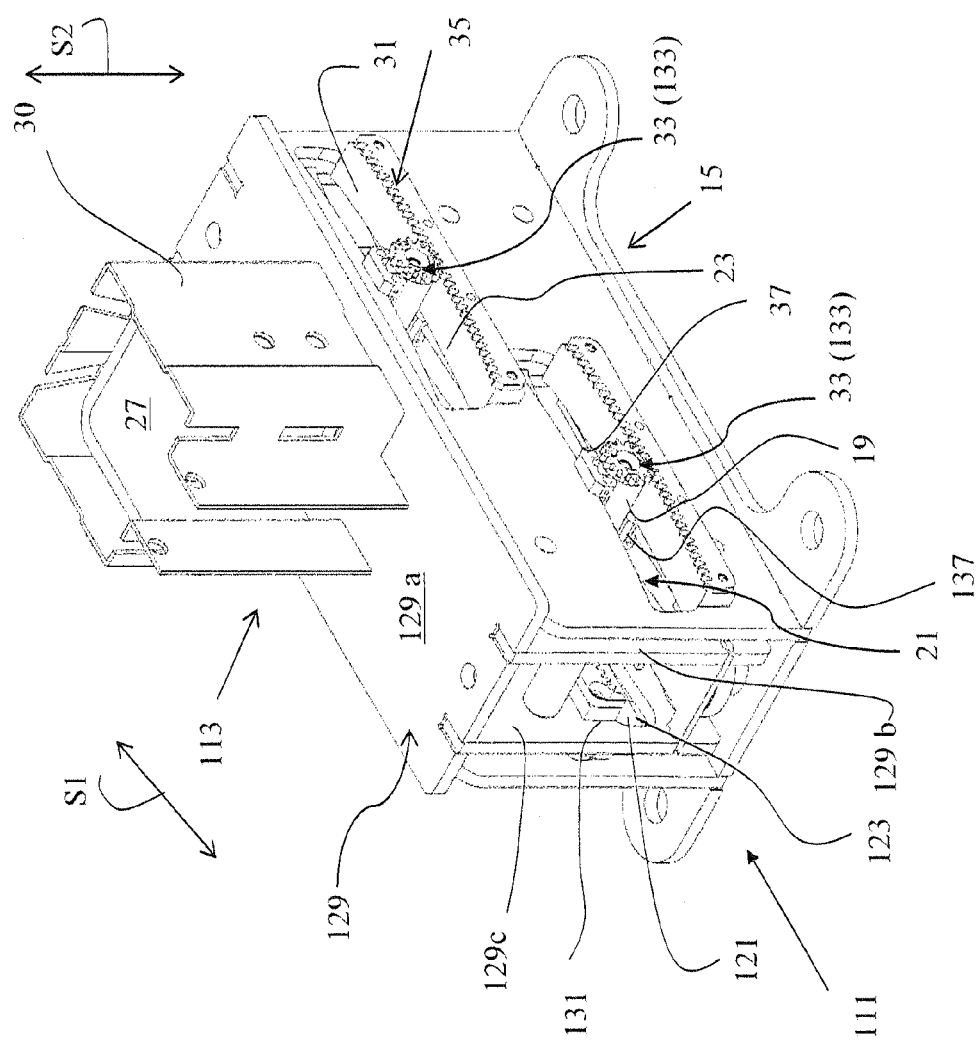
FIGS. 2A and 2B are perspective views of the isolator according to the invention in a double pendulum embodiment with and without engagement element, respectively.
Figure 2B:
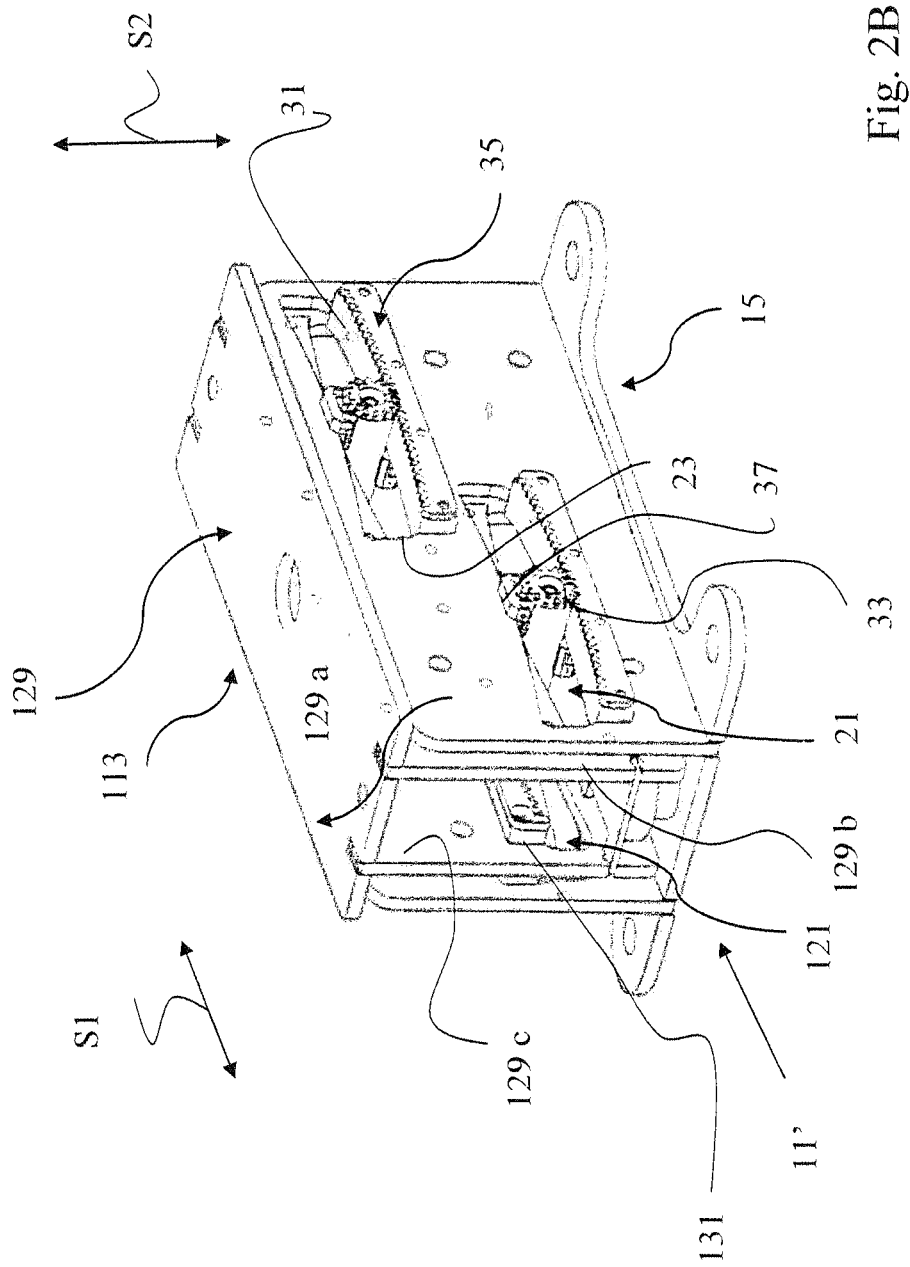

In a preferred embodiment of the invention, the oscillating framework 129 has a U-shaped cross section and comprises a base plate 129a intended to support the structure to be isolated from the ground, such as a shelving unit, and pairs of side walls 129b, 129c parallel to each other and perpendicular to the respective base plate 129a. In operating conditions, the U-shaped framework 129 will have the concavity facing downwards as shown in FIGS. 2A, 2B. The framework 129 and supporting framework 15 will therefore have the respective concavities facing each another. Alternatively to the U-shaped section, the oscillating framework 129 can comprise a rectangular section tubular profile. The oscillating framework 129 may also be made of the same materials and with the same modalities of the supporting framework 15, advantageously reducing the production costs of the isolator. Furthermore, the framework 129 may advantageously comprise an engagement element 30 (FIG. 2A) equipped with a seat 27, for fixing an upright or foot of the structure to be isolated, for example by means of screws or bolts. Alternatively (FIG. 2B), the isolator 111 will be free of engagement element (30) and provided with a flat base plate 129, on which resting a part of the base of the structure to be isolated.

The oscillating framework 129 is associated with the framework 15 by means of connecting elements 19 slidable in pairs of substantially parallel arched guides 21, 121, arranged in both frameworks 15, 129, whereby said frameworks 15, 129 are mutually oscillating and the mutual oscillation of the frameworks 15, 129 causes the mutual sliding along two directions S1, S2 perpendicular to each other.

According to this embodiment of the invention, the arched guides 21, 121 preferably comprise corresponding arched slots 23, 123 formed in the side walls of the respective frameworks 15, 129. When the isolator is in the operating configuration, the concavity of the guides and of the slots will be also advantageously facing upwards in the support framework 15, i.e., towards the structure to be insulated, and downwards, i.e., towards the ground, in the oscillating framework 129. Furthermore, the arched profile of the guides or corresponding slots will be advantageously equal for all the guides or slots and the guides or slots of the supporting framework 15 will be substantially specular with respect to the guide or slot provided on the adjacent oscillating framework 129.

Moreover, advantageously, the slots 23, 123 receive each an insert 31, 131, preferably made of a low friction coefficient and high hardness material. The inserts 31 associated with the slots 23 of the framework 15 define a corresponding sliding surface along the lower edge of the slot 23 formed in the supporting framework 15 and the inserts 131 associated with the slot 123 formed in the framework 129 define a corresponding sliding surface along the upper edge of the slot 123 formed in the oscillating framework 129. Therefore, said inserts are arranged along the edges of the respective slots that are more subject to the axial forces exerted by the pins 19 during the oscillation of the oscillating element 113 and the corresponding oscillating framework 129 with respect to the supporting framework 15. Said inserts 31, 131 also contribute to reducing the backlash between the pins 19 and the corresponding slot. A further peculiarity of the inserts 31, 131 derives from the fact that they are preferably not rigidly connected to the respective framework, but only supported in the slots 23, 123. Advantageously, due to this arrangement, the inserts will adapt to any errors in the construction of frameworks and slots, eliminating any backlash and enabling a more fluid sliding of the pins 19.

According to this embodiment of the invention, between the pins 19 and the slots 23, 123 there are provided pinions 33, 133 which are in meshing engagement in corresponding toothed racks 35 defined along the slots 23, 123 and more preferably along the inserts 31, 131.

The meshing between the pinions 33, 133 and the respective toothed racks advantageously allows to maintain the phasing of the pins 19 between the opposite sides of the isolator, during the oscillations of the oscillating framework 129 relative to the supporting framework 15. The pins 19 will thus be advantageously rotatable so as to maintain this phasing.

Slide shoes 37, 137 provided with needle rollers 39, 41 are preferably arranged at the ends of the pins 19 on those edges of the slots 23, 123 opposed to those provided with inserts 31, 131.

Said slide shoes 37, 137 are also provided with containment flanks 43 intended for preventing the slide shoes 37, 137 from laterally slipping out of the respective slots 23, 123.

The slide shoes 37 associated with the framework 15 bear the vertical loads of upward traction, while the slide shoes 137 associated with the oscillating framework 129 bear the vertical loads of downward thrust. The presence of the needle rollers 39, 41, four in the illustrated example, interposed between the pins 19 and the surface of the slots 23, 123, determines the inversion of the circular motion (arrows C1 and C2 in FIG. 5), which is essential for uniforming the peripheral speed between the upper and lower profile of the slots, avoiding sliding with the pins 19

In each slide shoe 37, 137, the inner needle rollers 39, two in the example illustrated, rotated by the pins 19 and tangent to the inner surface of the slot 23, 123, do not slide but roll on the edge of the slot 23, 123 in the direction required by the motion. On the contrary, the outer needle rollers 41 have an anti-rotation function for the slide shoe 37, 137, in order to prevent the tendency of slide shoes 37, 137 to rotate around the respective pin 19.

Figure 6:
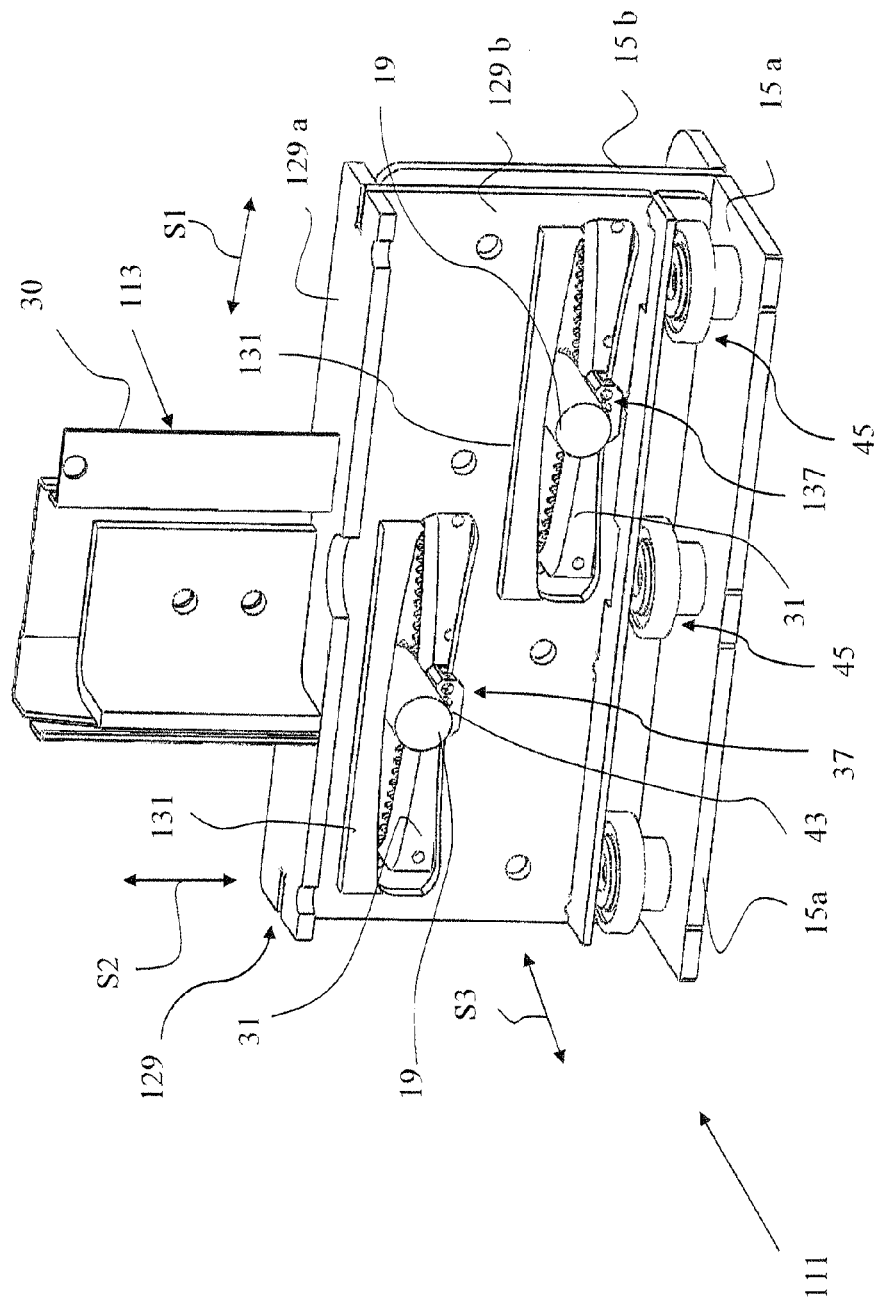
FIG. 6 is a longitudinal section view of the isolator in FIG. 2.

As better shown in FIG. 6, the arrangement of the slide shoes 37, 137 provided with needle rollers 39, 41 and of the inserts 31, 131 is inverted in the oscillating framework 129 with respect to the supporting framework 15 as the vertical loads exerted on the two frameworks 15, 129 by the connecting pins 19 have opposite directions.

The base plate 15a of the supporting framework 15 is also internally provided with rolling bearings 45, having the axis of rotation substantially perpendicular to the axis of the pins 19, and on which the inner surfaces of the side walls 129b, 129c of the oscillating framework 129 slide. Said bearings 45 withstand the reactions of normal loads (direction S3) to the direction of movement of the oscillating framework 113 along the direction S1.

Figure 3:
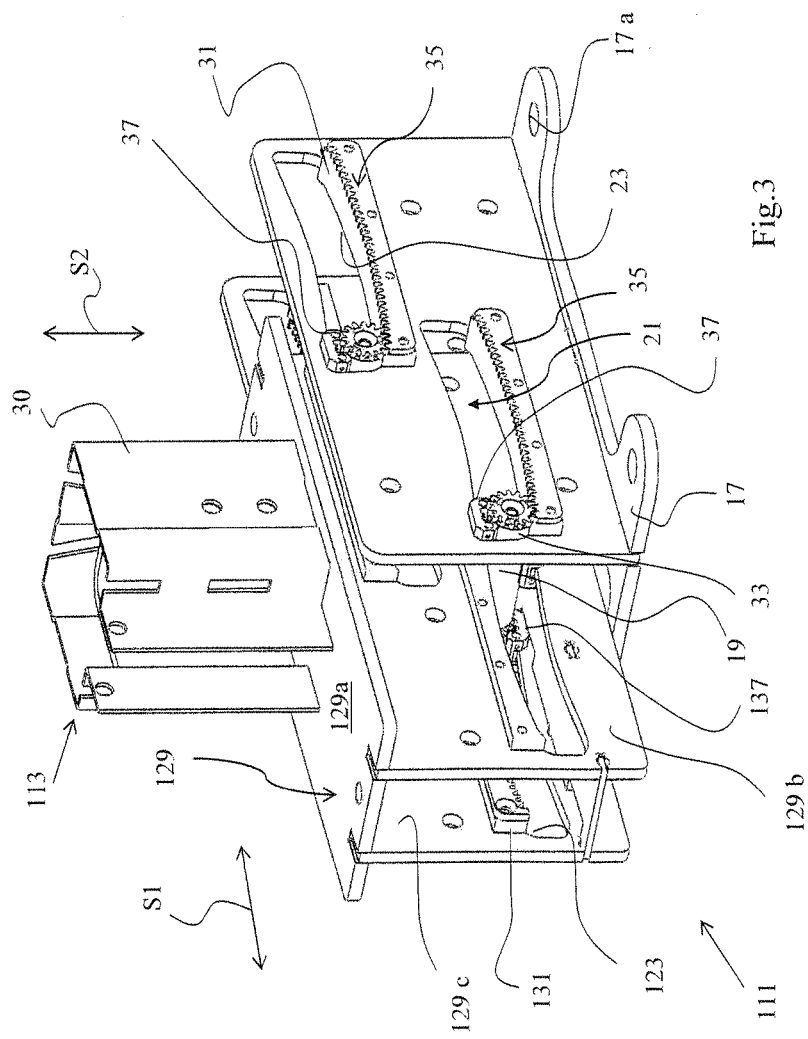
FIG. 3 is a perspective view of the isolator in FIG. 2, when it is in the position of maximum travel.
Figure 4:
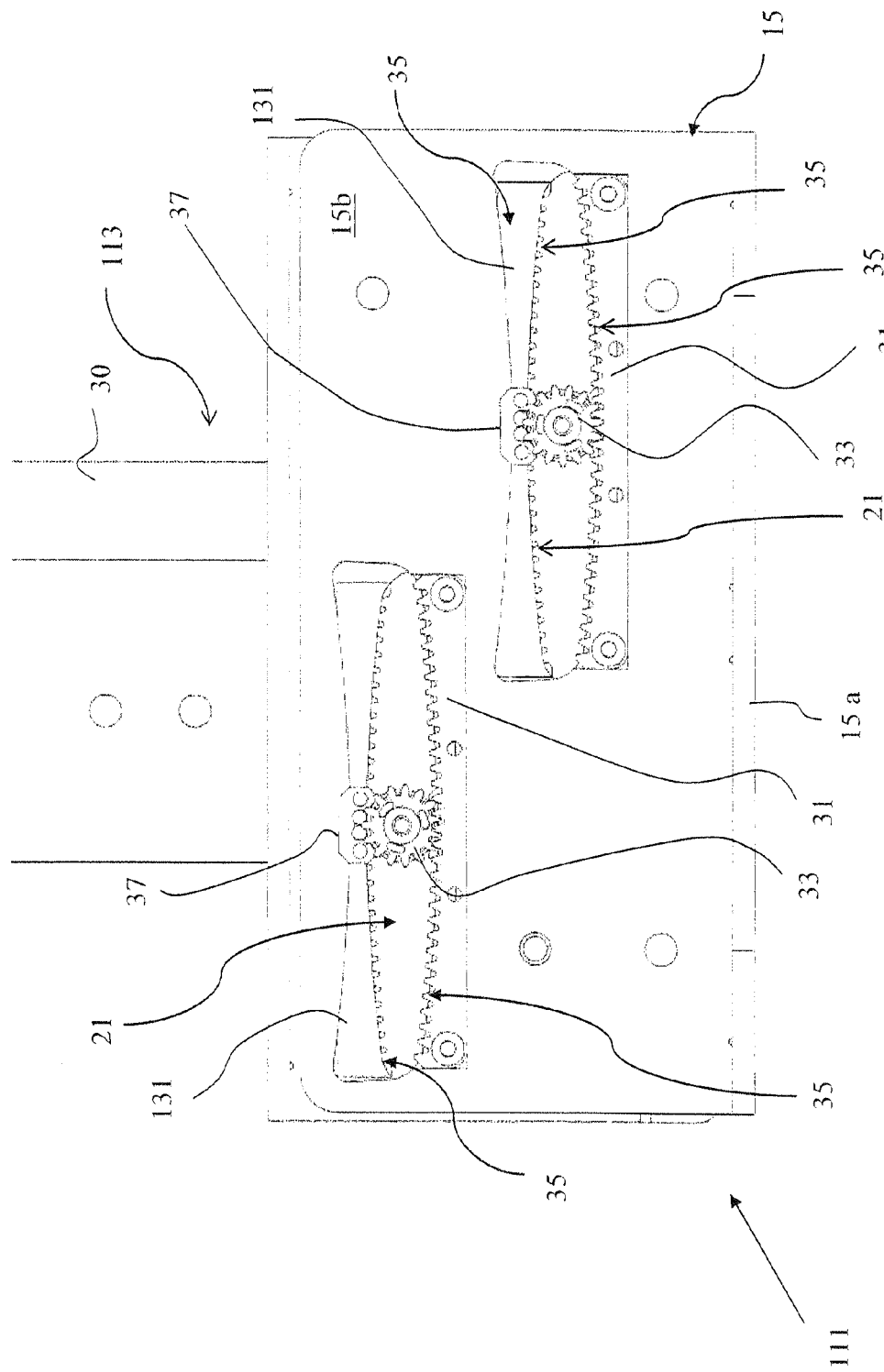
FIG. 4 is a side view of the isolator in FIG. 2.
Figure 5:
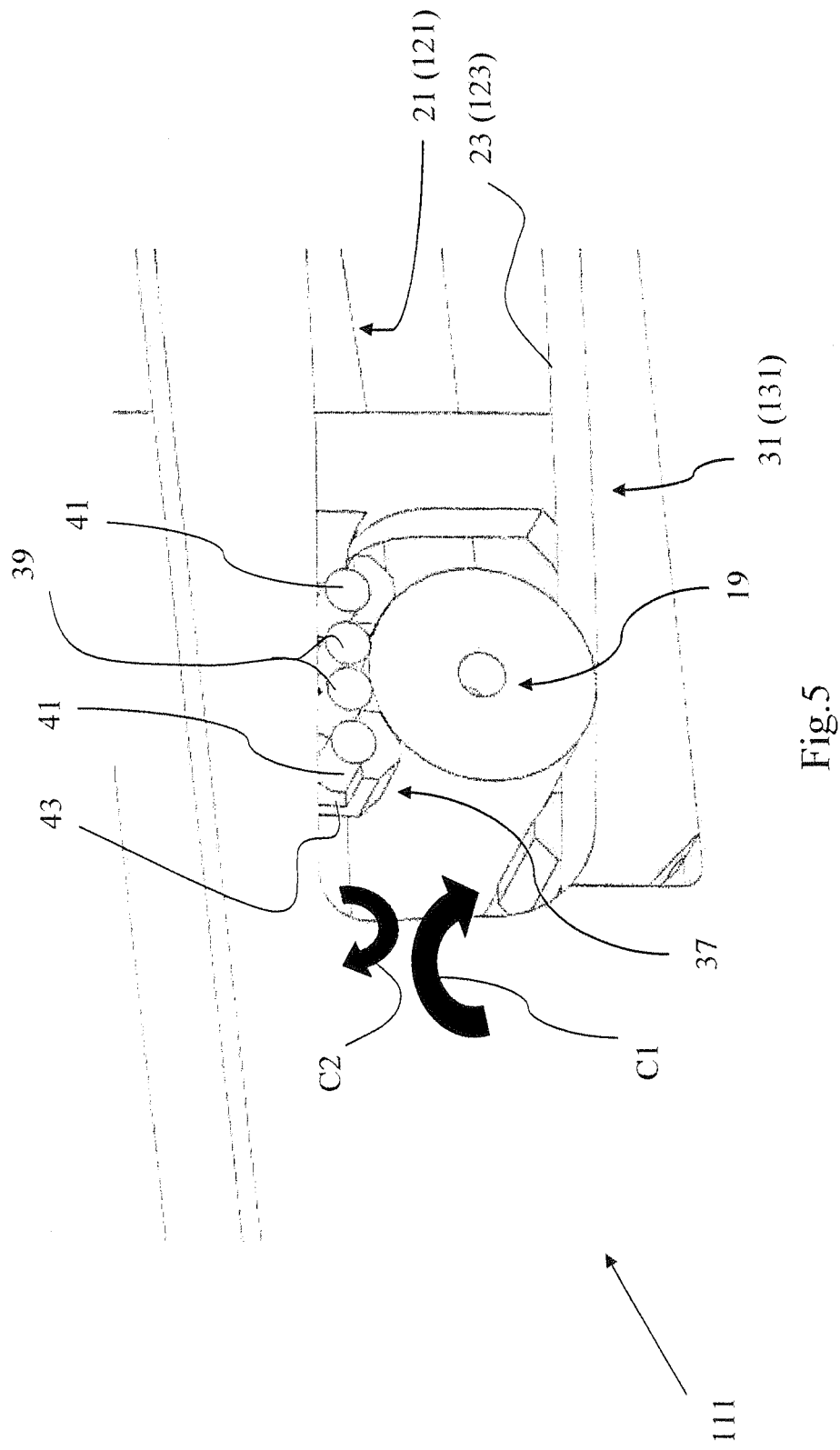
FIG. 5 is a detailed view of the needle roller element.

As it can be better noted in FIG. 3, in this embodiment, the oscillating framework 129 on which at least one foot or an upright of the structure rests is slidable relative to the supporting framework 15. Furthermore, the framework 15 will preferably be firmly anchored to the ground by means of fastening means such as screws or bolts passing through the holes 17a provided in the side projections 17. Furthermore, in the embodiment shown, the oscillating framework 129 is substantially housed within the supporting framework 15. It can also be noted how FIG. 3 illustrates a configuration of maximum travel in one of the senses of the sliding direction S1 of the oscillating framework 129 with respect to the supporting framework 15.

Advantageously, the cooperation between the pins 19 and the slots 23, 123, in addition to transmitting the pendulum oscillation to the framework 129, also contributes to keep the base 129a of said framework 129 always horizontal during the oscillation.

This function is carried out on condition that the two pins 19 remain always phased.

Advantageously, this result is achieved due to the fact that the pins 19 roll without sliding on the inserts 31, 131, that the insert 31 provided in the slots 23 of the supporting framework 15 slides with respect to the oscillating framework 129 substantially without backlash, due to the inserts 31, 131 and to the fact that the pins 19 slide in phase due to the meshing between the pinion 33, 133 and the corresponding toothed rack 35.

The configuration that provides for the meshing of the pinion and the toothed rack at all guides is the one that ensures the absolute phasing at all positions that the isolator will have during its use. However, it is also possible to provide for this meshing only at the guides arranged on the supporting framework 15 or on the oscillating framework 129, or only on some of the guides of one or both frameworks.

Figure 7:
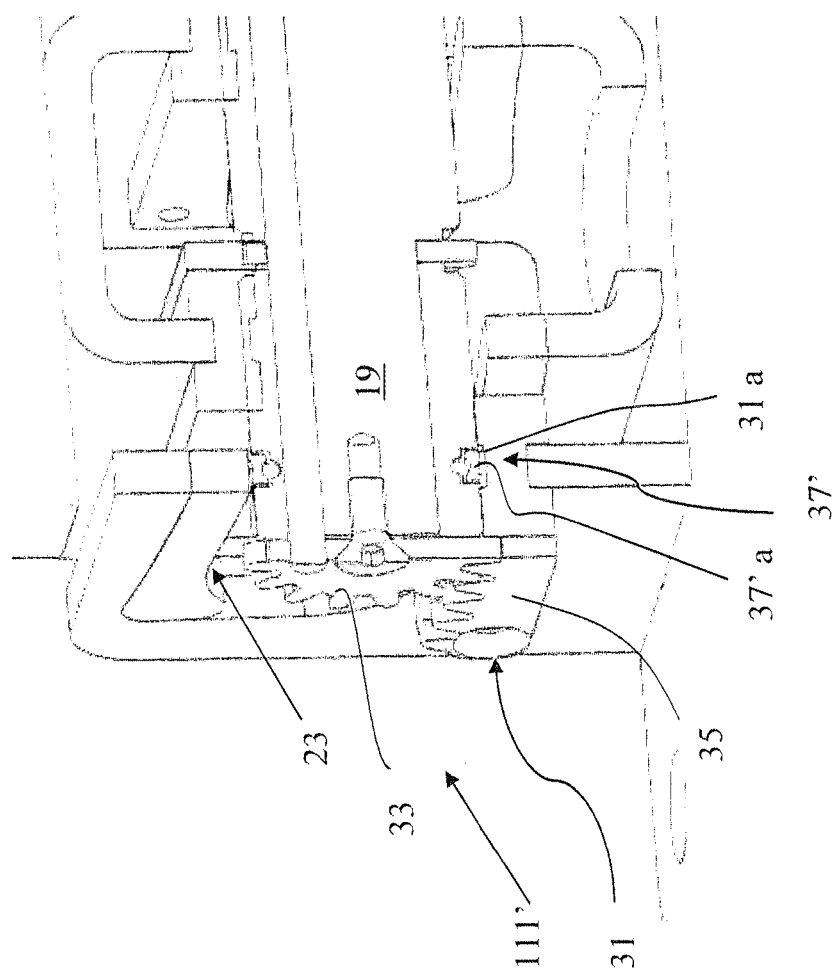
FIG. 7 is a cross sectional view of an isolator provided with bearings.

With reference to FIG. 7, an isolator 111' is shown in cross section, which is equipped with bearings 37' embedded in the connecting element 19 and cooperating through the outer cage 37'a with the upper surface of the slot 23. A groove 31a formed in the lower insert 31 at the bearing 37' avoids the contact of the bearing 37' with said insert 31.

Figure 8:
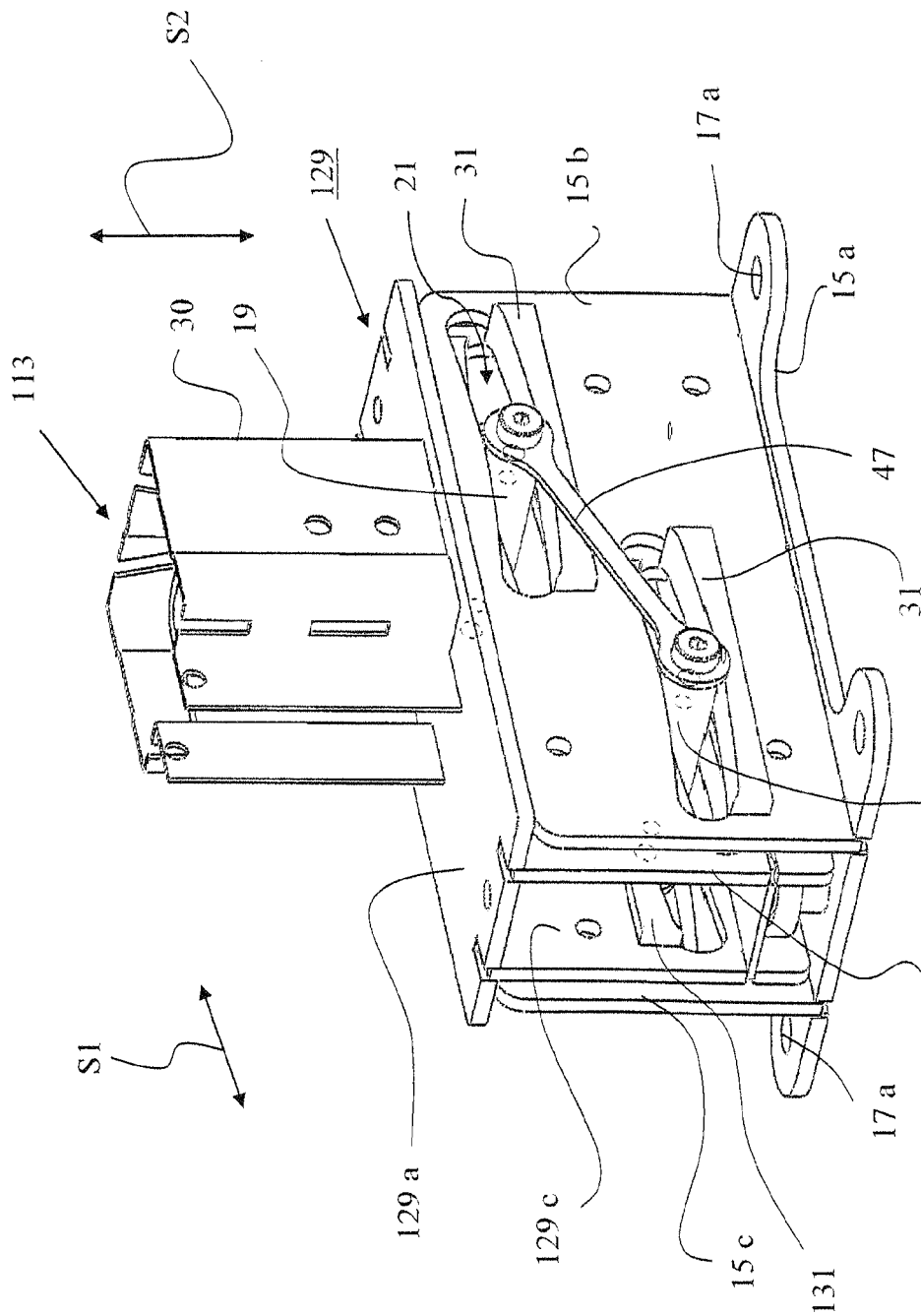
FIG. 8 is a perspective view of the double pendulum isolator, in a first variation of the embodiment.

With reference to FIG. 8, a variation of the second embodiment of the invention is illustrated, from which the slide shoes 37, 137 provided with needle rollers 39, 41 have been deleted. The isolator according to this version is identified by reference 111". This configuration is particularly suitable, for example, for applications where the inversion of the vertical loads does not occur (direction S1) and therefore only the tensile force during the static phase is considered. Such a condition occurs, for example, in a shelving unit where it is necessary to prevent only the impact conditions resulting for example from positioning the pallets by means of a forklift truck.

Again with reference to FIG. 8, there is also shown a variant of the means for the phasing of the pins 19, substantially applicable also to the previous embodiment of FIG. 2, in addition or alternative to the system of toothed racks and pinions, which are constituted in this case by connecting rods 47 hinged to the adjacent ends of the pins 19.

Figure 9A:
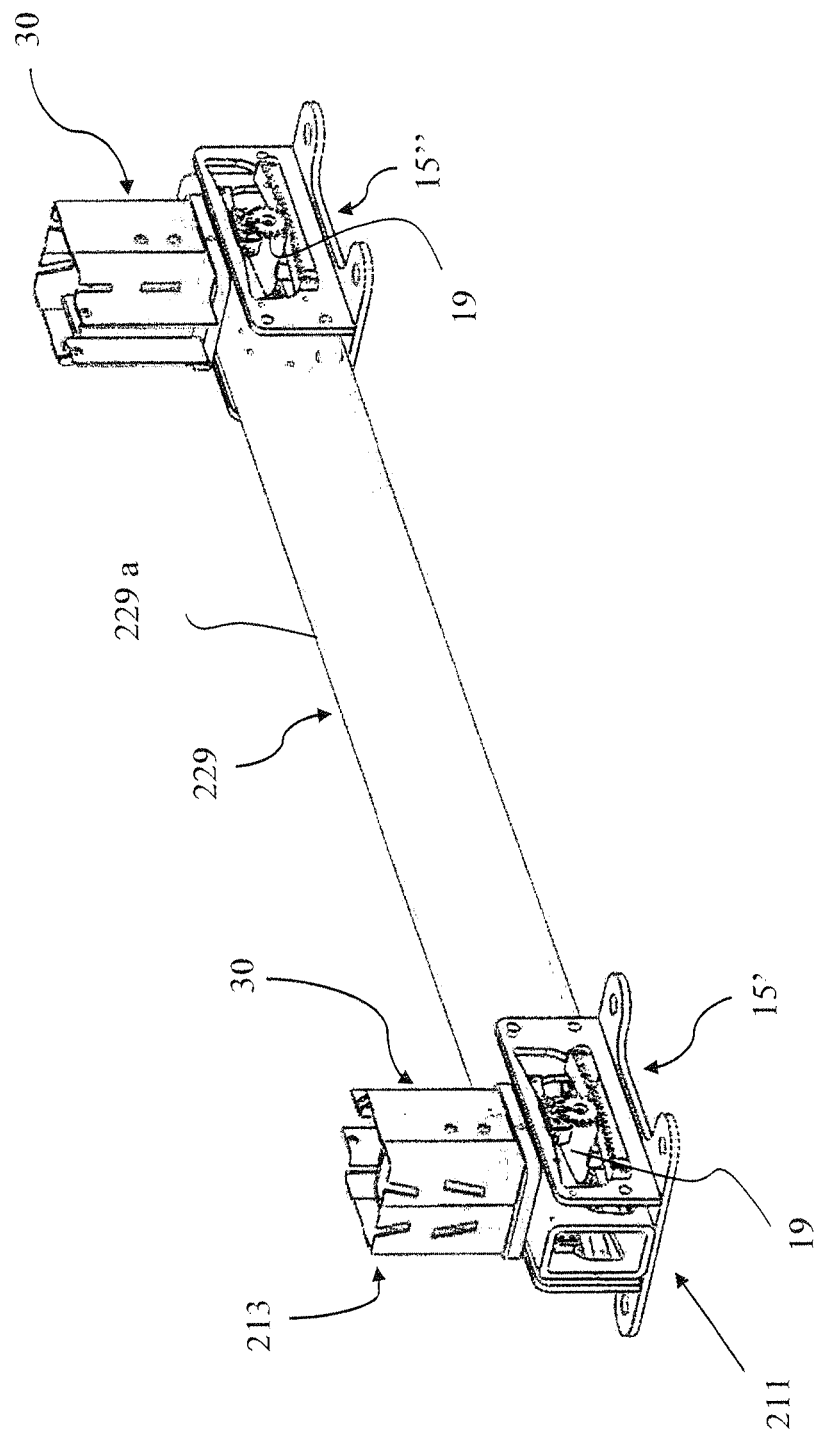
FIGS. 9A and 9B are a perspective view of the double pendulum isolator in a second embodiment and of the isolator applied to a shelf, respectively.
Figure 9B:
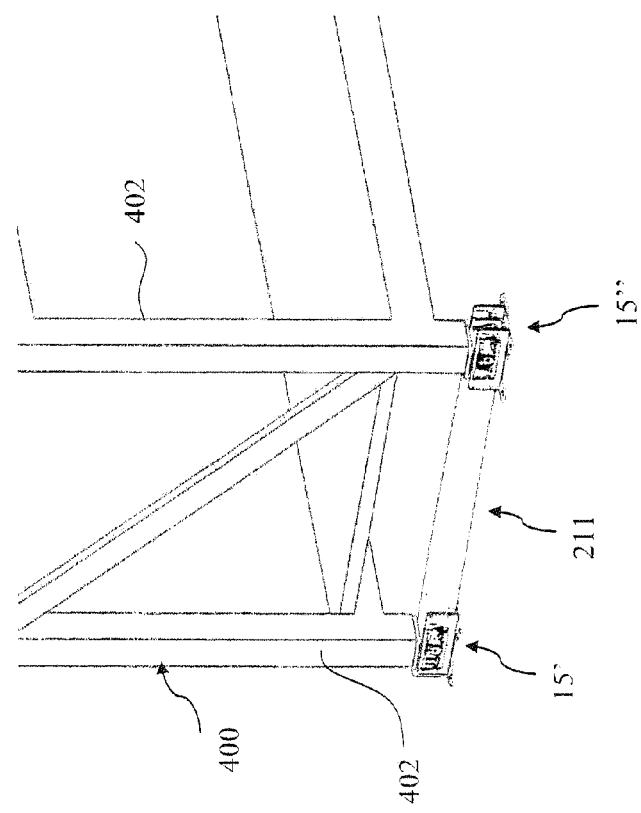

With reference to FIGS. 9A and 9B, a modular configuration of the double pendulum isolator is shown, generally indicated by reference 211.

This configuration provides for a double pendulum isolator, in which the oscillating element 213 is provided with an oscillating framework 229 adapted to receive more uprights or feet 402, two in the illustrated example, of a structure 400, for example of a shelf to be isolated from the ground. For this purpose, the base 229a of the oscillating framework 229 is advantageously provided with engagement elements 30 to which the uprights or legs of the structure of the shelf or shelving may be attached, for example, by means of screws or bolts. Moreover, in the illustrated example, the supporting framework comprises a first 15' portion and a second 15" portion, which are separated. However, it is possible to provide for said portions linked together.

The configuration shown provides for the pins 19 to be arranged substantially at the vertical of the engagement elements 30, however this modular configuration also allows to enlarge the extension of projecting parts when the pins 19 are arranged internally with respect to the vertical of the engagement elements 30 for the uprights of the structure and, therefore, these uprights will be at opposite ends of the isolator 211. The advantage of such a cantilevered solution is to optimize the overall dimensions during the travels in an earthquake, but also in the static situation in order to safeguard the maneuvers of the forklift trucks during the transport of pallets, where the maximum dimension is defined only by the upright as in the absence of an isolator.

Figure 10:
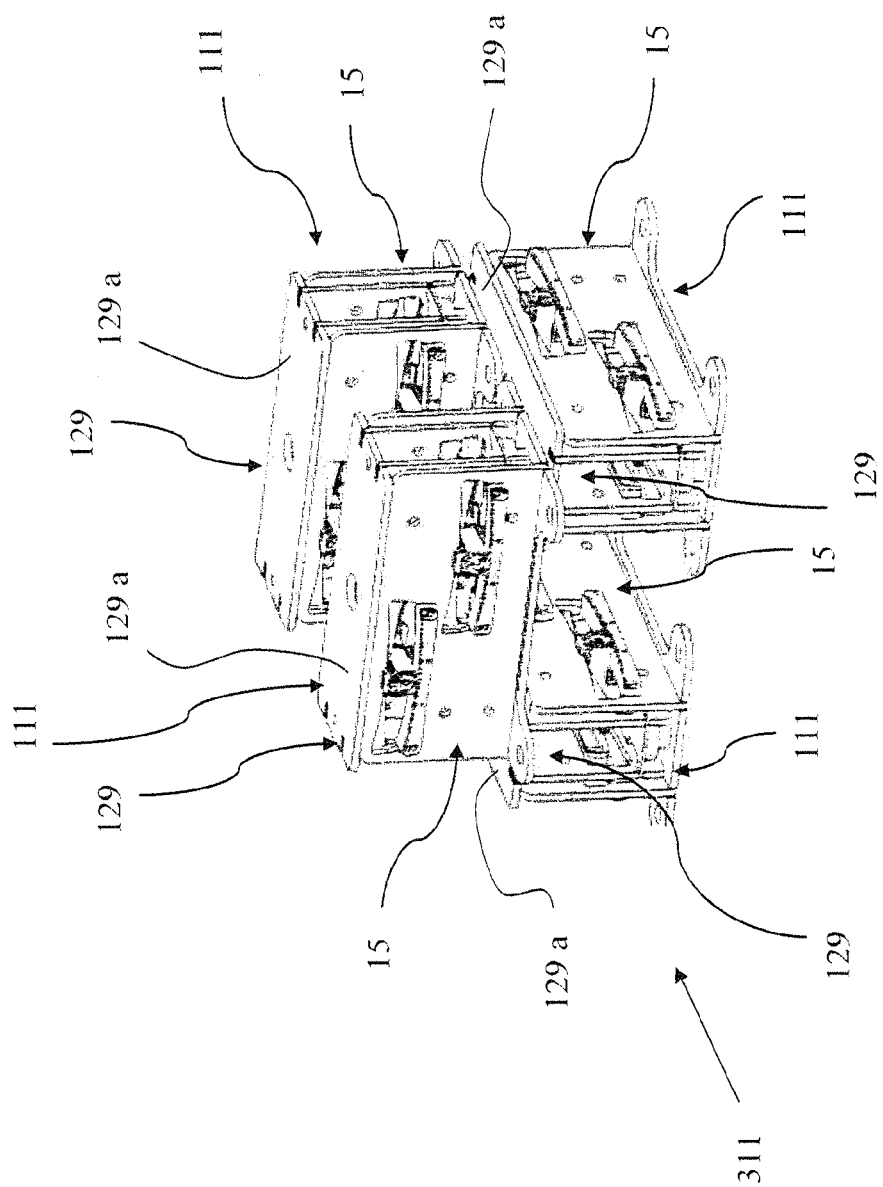
FIG. 10 is a perspective view of a combination of the isolators in FIG. 2.

With reference to FIG. 10, there is shown a combination of isolators of the type illustrated in FIG. 2B.

Advantageously, it is possible to superimpose multiple pairs of isolators 111 to form a tower multi-directional combined isolator 311. According to this embodiment of the invention a first pair of isolators 111 (lower isolators) arranged parallel to each other is associated with a second pair of isolators 111 (upper isolators) arranged parallel to each other, but rotated by 90° and with their relevant oscillating frameworks 15 associated with the base plates 129 of the lower isolators. The isolator is therefore remarkably versatile as it can originate modular structures starting from a plurality of identical isolators.

Figure 11B:
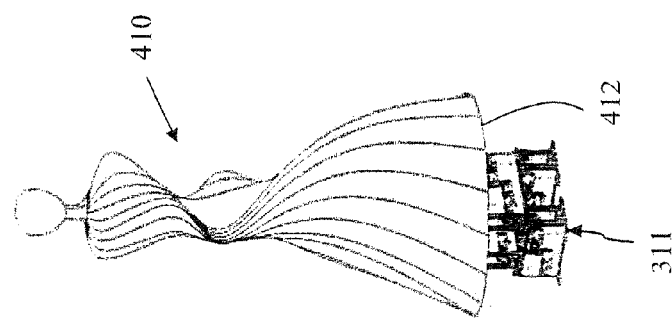
FIG. 11B is a perspective view of a second example of application of the isolator according to the invention.
Figure 11A:
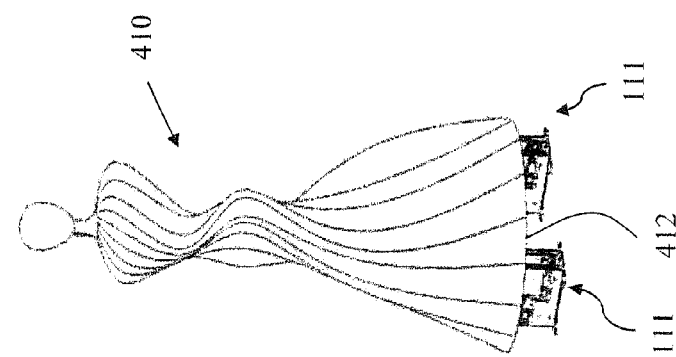
FIG. 11A is a perspective view of a first example of application of the isolator according to the invention.

FIG. 11A shows an example of application of the isolator to a work of art, in this case a statue 410. According to this embodiment, the base 412 of the statue is advantageously supported by two isolators 211 of the type illustrated in FIG. 2A. However, it is important to note that also other embodiments of the invention may be advantageously used for the same and other similar applications. For example, with reference to FIG. 11B, a similar application is shown that uses isolators 311 of the type illustrated in FIG. 10.

Figure 12:
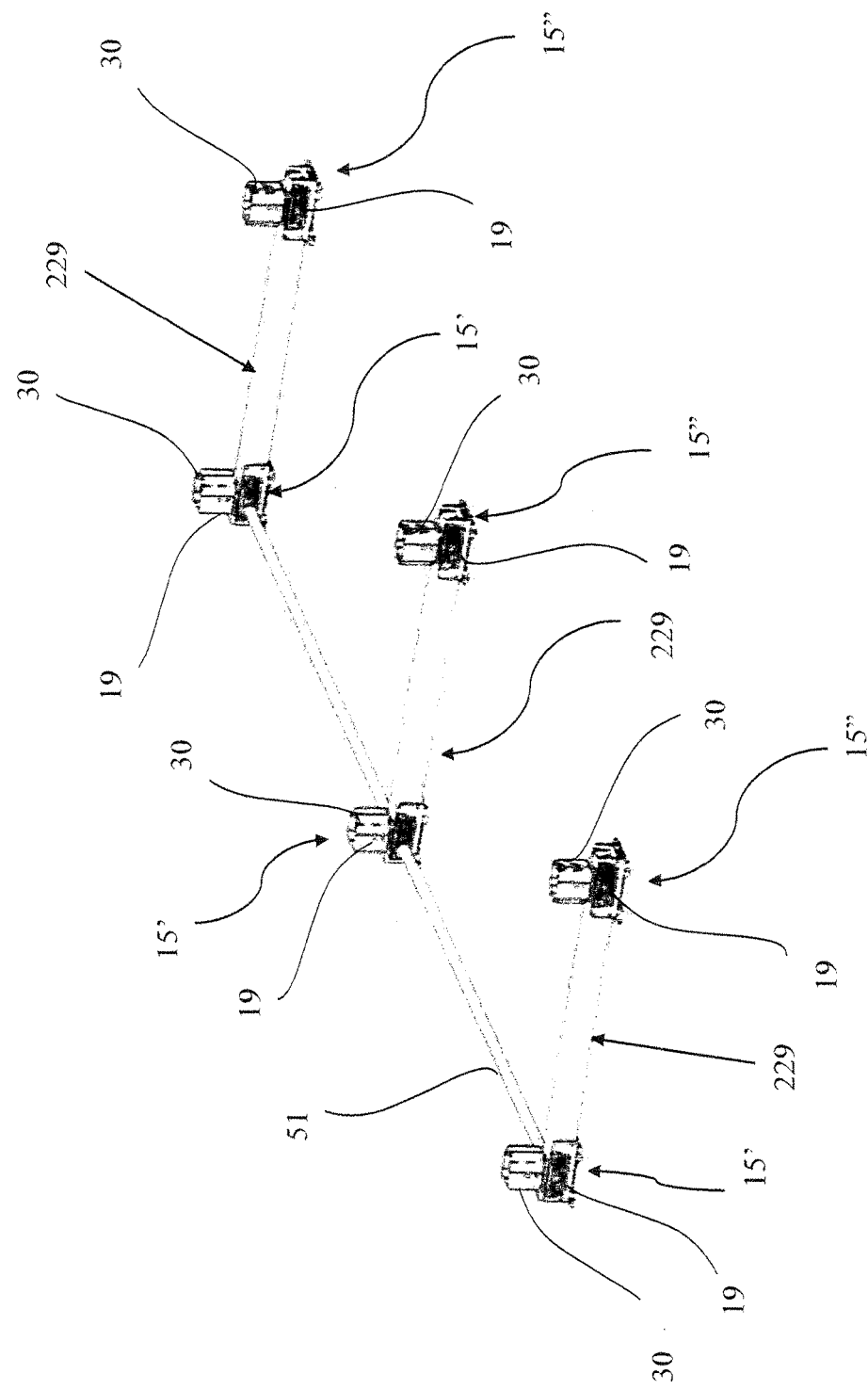
FIG. 12 is a top perspective view of the phasing system of the isolators according to the invention.

With reference to FIG. 12, the phasing system of the isolators is shown, which comprises a phasing shaft 51 associated with at least two isolators. The phasing shaft comprises a portion which is engaged in a hole that passes through the connecting pin 19 of the corresponding isolator 51 concerned by the phasing shaft 51. Alternatively, the pin 19 can be represented by a portion of the shaft 51 and hence be integrated in said phasing shaft. Advantageously, said phasing shaft 51 allows to maintain the oscillations of the various pins 19 provided in the isolators substantially in phase with each other. Further advantageously, this solution allows to avoid costly horizontal braces and reduces the stress on the elements of the shelving units, which are typically not much resistant to horizontal and shear forces.

The isolators associated with the phasing shaft 51 will preferably be of modular type, described above with reference to FIGS. 9A and 9B. In this case, it is sufficient to provide for only one phasing shaft 51 associated with the pin 19 of one of the engagement elements 30 provided for a corresponding upright. The isolator as described and illustrated can be subjected to numerous changes and variations, all within the scope of the inventive concept exposed.

The invention claimed is:

1. An anti-seismic isolator for isolating a structure from a ground or pavement subject to vibrations induced by a seism, said isolator comprising:
   an oscillating element comprising an oscillating framework adapted to support the structure with respect to the isolator;
   a supporting framework provided with a supporting base adapted to support the isolator with respect to the ground or pavement, wherein connecting elements slidable in pairs of substantially parallel arched guides are arranged in at least one of said oscillating framework and said supporting framework, wherein the arched guides comprise arched slots formed in the side walls of the supporting and oscillating frameworks, wherein said oscillating framework and said supporting framework are configured to mutually oscillate, and when mutually oscillating causes a simultaneous mutual sliding of the oscillating framework and the supporting framework along two directions perpendicular to each other, wherein the slots receive inserts, and wherein the inserts associated with the slots of the supporting framework define a corresponding sliding surface along a lower edge of the slot formed in the supporting framework and the inserts associated with the slots formed in the oscillating framework define a corresponding sliding surface along an upper edge of the slot formed in the oscillating framework, said inserts being arranged along edges of the respective slots that are subject to axial forces exerted by the connecting elements during oscillation; and
   slide shoes provided with needle rollers arranged at the ends of the connecting elements on one of the upper and lower edges of the slots that is opposite to the upper and lower edges provided with the inserts, said slide shoes being further provided with containment flanks intended for preventing the slide shoes from laterally slipping out of the respective slots.

2. The isolator according to claim 1, wherein the supporting framework comprises:
   a base plate configured to rest on the ground or pavement; and
   pairs of mutually parallel side walls perpendicular to the base plate.

3. The isolator according to claim 1, wherein the oscillating framework comprises:
   a base plate configured to support the structure to be isolated from the ground; and
   pairs of mutually parallel side walls perpendicular to the base plate.

4. The isolator according to claim 3, and wherein, when the isolator is in an operating configuration, a concavity of the slots is directed upwards in the supporting framework, towards the structure to be isolated, and downwards, towards the ground, in the oscillating framework.

5. The isolator according to claim 1, wherein between the connecting elements and the slots there are provided pinions that are integral with the connecting elements and are in engagement in corresponding toothed racks defined along the slots, the engagement between the pinions and the corresponding toothed racks allowing to maintain phasing of the connecting elements between the opposite sides of the isolator during the oscillation.

6. The isolator according to claim 1, wherein connecting rods are hinged on adjacent ends of the connecting elements in order to maintain phasing of the connecting elements during oscillation.

7. The isolator according to claim 4, wherein said isolator comprises bearings in the connecting element.

8. The isolator according to claim 1, wherein said connecting element is associated with a phasing shaft that is associated with a connecting element of a second isolator.

9. A shelving structure comprising:
   a plurality of supporting legs or uprights with respect to a ground or pavement subject to vibrations induced by a seism; and
   an insulator coupled to at least one of the support legs or uprights, the insulator including:
     an oscillating element comprising an oscillating framework adapted to support the structure with respect to the isolator;
     a supporting framework provided with a supporting base adapted to support the isolator with respect to the ground or pavement, wherein connecting elements slidable in pairs of substantially parallel arched guides are arranged in at least one of said oscillating framework and said supporting framework, wherein said oscillating framework and said supporting framework are configured to mutually oscillate, and when mutually oscillating, the oscillating framework and the supporting framework causes a simultaneous mutual sliding of the oscillating framework and the supporting framework along two directions perpendicular to each other, wherein the arched guides comprise arched slots formed in the side walls of the frameworks, wherein the slots receive inserts, and wherein the inserts associated with the slots of the supporting framework define a corresponding sliding surface along a lower edge of the slot formed in the supporting framework and the inserts associated with the slots formed in the oscillating framework define a corresponding sliding surface along an upper edge of the slot formed in the oscillating framework, said inserts being arranged along edges of the respective slots that are subject to axial forces exerted by the connecting elements during oscillation; and slide shoes provided with needle rollers arranged at the ends of the connecting elements on one of the upper and lower edges of the slots that is opposite to the upper and lower edges provided with the inserts, said slide shoes being further provided with containment flanks intended for preventing the slide shoes from laterally slipping out of the respective slots.

10. The shelving structure according to claim 9, wherein the supporting framework comprises:

a base plate configured to rest on the ground or pavement; and pairs of mutually parallel side walls perpendicular to the base plate.

11. The shelving structure according to claim 9, wherein the oscillating framework comprises:

a base plate intended for supporting the structure to be isolated from the ground or pavement; and pairs of mutually parallel side walls perpendicular to the base plate.

12. The shelving structure according to claim 11, wherein, when the isolator is in an operating configuration, a concavity of the slots is directed upwards in the supporting framework, towards the structure to be isolated, and downwards, towards the ground or pavement, in the oscillating framework.

13. The shelving structure according to claim 9, wherein between the connecting elements and the slots there are provided pinions that are integral with the connecting elements and are in engagement in corresponding toothed racks defined along the slots, the engagement between the pinions and the corresponding toothed racks allowing to maintain phasing of the connecting elements between the opposite sides of the isolator during the oscillations.

14. The shelving structure according to claim 9, wherein connecting rods are hinged on adjacent ends of the connecting elements in order to maintain phasing of the connecting elements during oscillation.

* * * * *